Patented Feb. 26, 1935

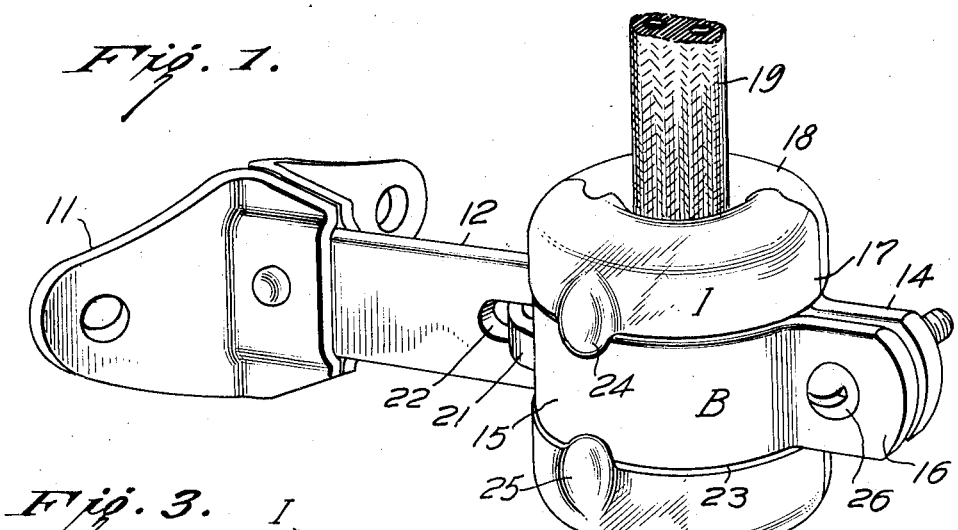
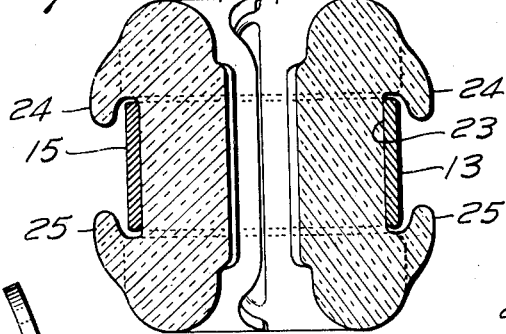
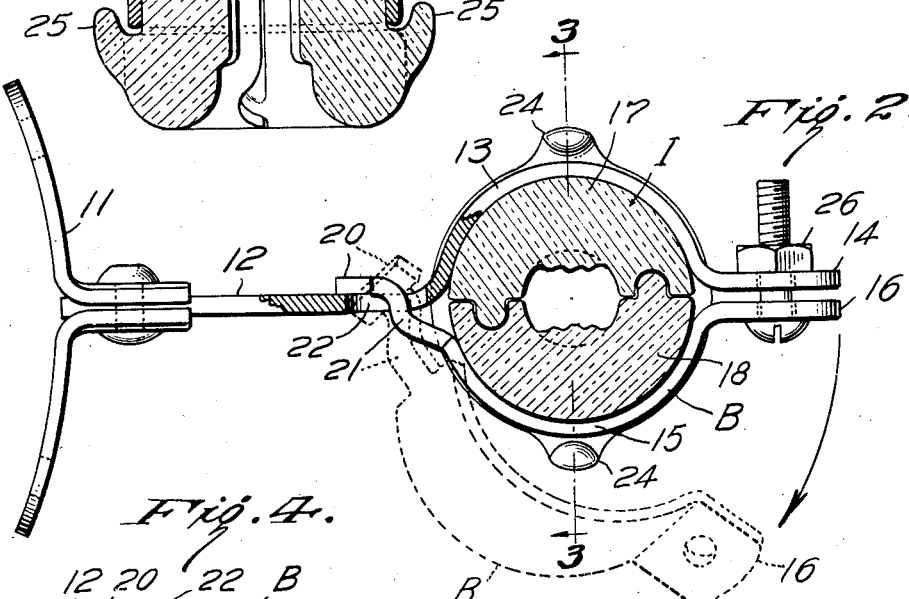
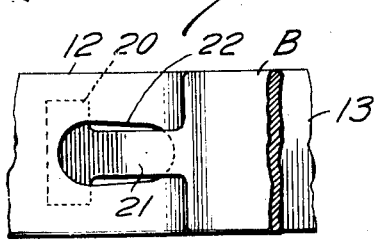

1,992,284

UNITED STATES PATENT OFFICE 1,992,284

BRACKET INSULATOR

William C. Banks, Jersey City, N. J.

Application July 29, 1932, Serial No. 625,855

3 Claims. (Cl. 173—314)

This invention relates to bracket insulators used to support electric power conveying lines from poles and the like.

One object of the invention is to devise a bracket which is easier for the lineman to handle, especially when he is up a pole and ready to place the bracket in permanent position. Another more precise object is to arrange the component parts of the bracket and its insulator so that there will be permitted a certain amount of relative movement of the parts when being assembled, without their falling apart, during manipulation thereof by the lineman. A still further object is to provide the bracket with its operating parts arranged to be most conveniently treated by the lineman.

One feature of the invention may be said to consist in providing a multi-part bracket and a multi-part insulator with a connection between one bracket part and one insulator part whereby one is locked to the other in a way to permit slight relative movement or adjustment. Another feature resides in the manner of securing the bracket parts together whereby prior to the final positioning of the parts in permanent position, the bracket parts with the insulator parts locked thereto, are capable of adjustment in more than one plane without the various parts becoming disassembled.

The invention possesses other objects and features of advantage, some of which, with the foregoing, will be set forth in the following description of my invention. In the accompanying drawing, I have illustrated the best embodiment of my invention known to me, but such embodiment is to be regarded as typical only of many possible embodiments and my invention is not to be limited thereto.

Figure 1 shows a perspective view of the insulating bracket of this invention. Figure 2 shows a top plan view thereof with parts in section. Figure 3 shows a vertical sectional view taken along the line 3—3 in Figure 2 while Figure 4 shows a fragmentary side view of the hinge connection between the bracket parts.

The insulated bracket is composed principally of a base plate 11 usually curved for attachment to a pole or other support, from which extends a shank 12 having a curved portion 13 terminating in a lug-like end 14. A second or strap-like part B of the bracket is hingedly secured to the bracket shank 12 and provided with a curved portion 15 and an end leg 16. These curved portions are adapted to clamp between them an insulator I composed of two parts 17 and 18. The electric conductor 19 is gripped between the insulator parts.

The strap-like part B of the bracket is preferably separably and hingedly fastened to the bracket shank 12 by means of a T-head 20 supported from the strap B by means of a bent neck portion 21. The locking T-head 20 which is preferably T-shaped, is threaded through a slot 22 in the shank 12 in a way to permit pivotal movement between the shank 12 and strap B in more than one plane, as shown in dotted lines in Figure 2.

In order that the curved part 13 of the bracket 4 and the strap B may each carry an insulator part without danger of disassembly of the insulator part from its bracket part, each insulator part is provided with a groove 23 in which may be seated the bracket part. So that this seated relationship may be maintained, each insulator part is provided with means for loosely, slidably or adjustably locking to its carrying bracket part, such as fingers 24 and 25 preferably integral with the insulator body extending toward each other over the groove 23 from the end or head portions of the insulator I.

This relationship is brought about by threading the lug end 16 of the strap B between the fingers 24 and 25 of insulator part 17. So that this operation may be made easy, the fingers may be rounded in cross-section, or streamlined, whereby jamming is prevented of the strap in the groove 23 during the threading operation. The same holds true for the assembling of the curved part 13 of the other bracket part and its associated insulator 18.

After each bracket part has been provided with the insulator part it is to carry clinging thereto, the strap part B is hinged to the shank 12 by turning the strap at right angles to the shank and threading the T-head 20 through the slot 22 in the shank. The strap B is then turned to be parallel to the shank and the lugs 14 and 16 may then be temporarily bolted together as at 26.

In this position, the insulated bracket is carried aloft by the lineman. When he is ready to install the bracket on the pole, he fastens the base 11 by means such as lag screws. Next he unbolts the parts in order to encircle the conduit 19 with the insulator and the parts take the relationship shown in dotted lines in Figure 2. But the strap B will not fall away from the bracket shank, and the insulator parts will not fall away from their carrying bracket parts even during considerable relative movement of all of these parts by the lineman in encircling the power conduit with the insulator parts. After such placement, the lineman secures the parts in permanent position by bolting at 26 the lug ends 14 and 16. The adjustable or slidable mounting of the insulator parts in the bracket elements permits shifting of the insulator in its bracket if necessary, and the loose connection allows for expansion and contraction of the parts.

By locating the hinge connection for the bracket parts between the insulator and the base, they are protected from inadvertent displacement by the lineman in the manipulation of the parts or in the handling of his tools. And by locating the bolting arrangement beyond the insulator, the bolting is facilitated.

I claim:

1. A bracket insulator for supporting a current line or wire having a multi-part bracket for attachment to a support such as a pole, a multi-part insulator for encircling the wire, and means for securing the bracket and insulator together in functioning position characterized by an arrangement for movably securing one insulator part to one bracket part and for movably securing together the bracket parts while each bears an insulator part whereby a lineman can ascend a pole with all the parts secure against disassembly but yet loosely connected to permit attachment of the bracket to the pole and to permit the encircling of the wire by the insulator together with adjustment of the insulator when in wire-encircling position in relation to the insulator supporting bracket parts, said arrangement comprising a grooved section of said insulator located between a head on each end thereof whose diameter is greater than the grooved section, a pair of fingers on each insulator part with each finger integral with a head projecting therefrom toward the opposite head, said fingers being spaced from each other and from the grooved section, each bracket part having adjustably carried thereby an insulator part wherein the bracket part extends into the grooved section of the insulator and is gripped by a pair of said fingers, means for detachably but incompletely securing said bracket parts together while permitting adjustment between the parts, and means for completely and rigidly locking said bracket parts together while locking the insulator parts for some rotational adjustment located at the extremity of the bracket farthest from its support for easy access by the lineman.

2. A bracket insulator for supporting a current line or wire formed in at least two parts for attachment to a support such as a pole, a multi-part insulator for encircling the wire formed with two head portions with a groove therebetween and fingers extending from each of said head portions over said groove, said bracket having portions located in said groove and beneath said fingers, and means for securing the bracket and insulator together in functioning position characterized by an arrangement for movably securing together certain of the bracket parts with an insulator part attached to each bracket part whereby the lineman can ascend a pole with the parts secure against disassembly but yet loosely connected to permit attachment of the bracket to the pole and to permit the encircling of the wire by the insulator, said arrangement comprising a base-plate for attachment to a pole, a bracket shank adapted to carry one of the insulator parts extending from said base-plate provided with a curved portion terminating in an end lug, a second bracket part or strap adapted to carry another insulator part having a curved portion terminating in an end lug and at the other end in a T-head, said bracket shank having a slot between its curved portion and said base-plate into which said T-head is adapted to fit for permitting pivotal movement between the shank and the strap in more than one plane while each of said shank and strap has clinging thereto an insulator part, and bolt means for rigidly securing together the said end lugs at the extremity of the bracket distant from the base-plate for clamping said insulator parts together in wire gripping and encircling position.

3. A bracket insulator as defined in and by claim 1 and which is constructed so that a bracket part has a curved body section and a narrow section at an end of the body section and in respect to which bracket part the corresponding insulating part can be assembled by an initial movement during which the fingers of insulating part pass over said narrow section of said bracket part and which initial movement is followed by a relative turning movement of the corresponding insulating part within the curved body section and which turning movement causes the fingers to pass over the curved body section whereby the bracket part and the corresponding insulating part are held assembled.

WILLIAM C. BANKS.